Nov. 8, 1938.  O. T. NELSON  2,135,990
DASHBOARD TIRE PRESSURE GAUGE
Filed Aug. 29, 1933   2 Sheets-Sheet 1
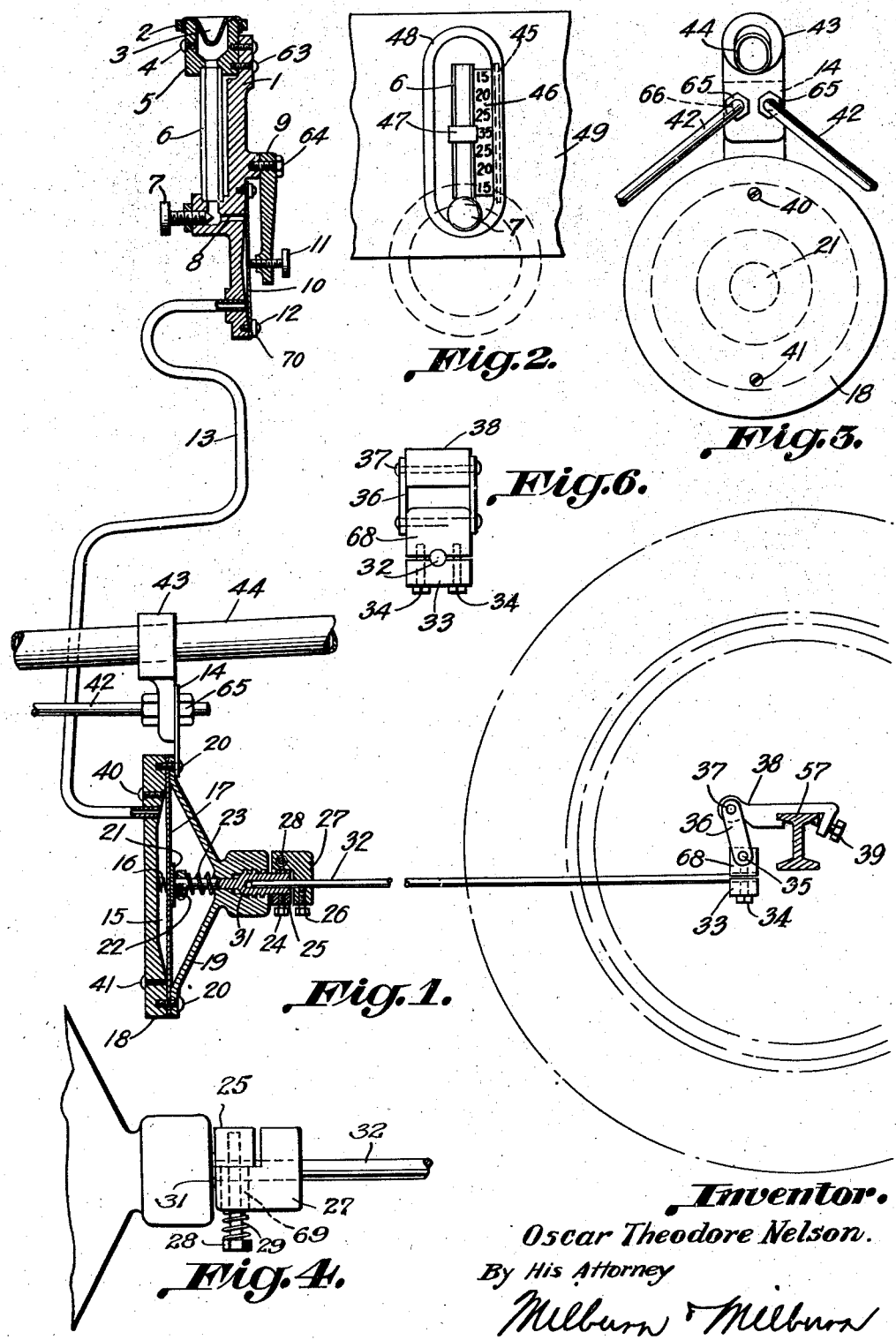
Inventor.
Oscar Theodore Nelson.
By His Attorney
Milburn & Milburn Nov. 8, 1938. O. T. NELSON 2,135,990
DASHBOARD TIRE PRESSURE GAUGE
Filed Aug. 29, 1933 2 Sheets-Sheet 2
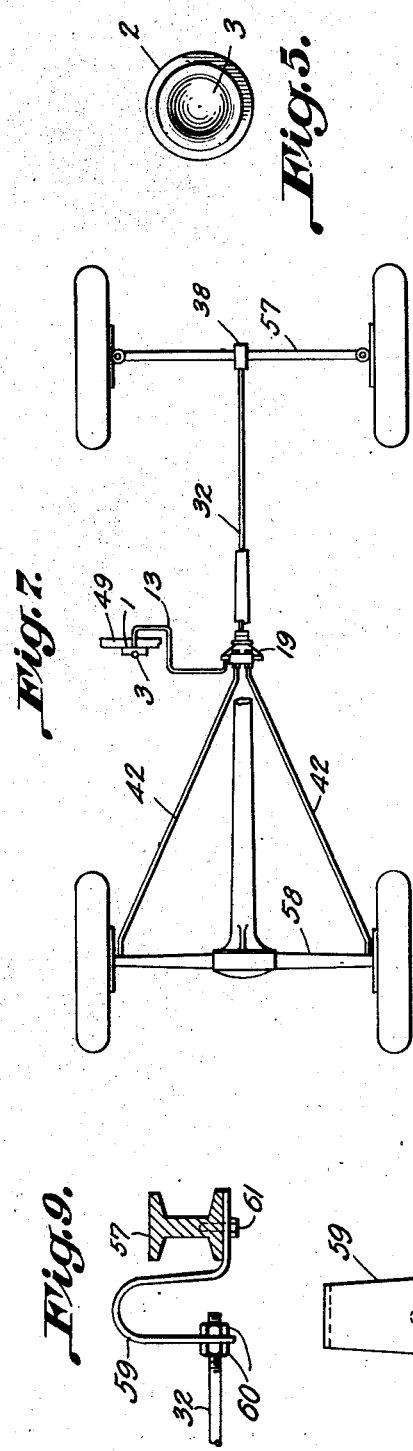
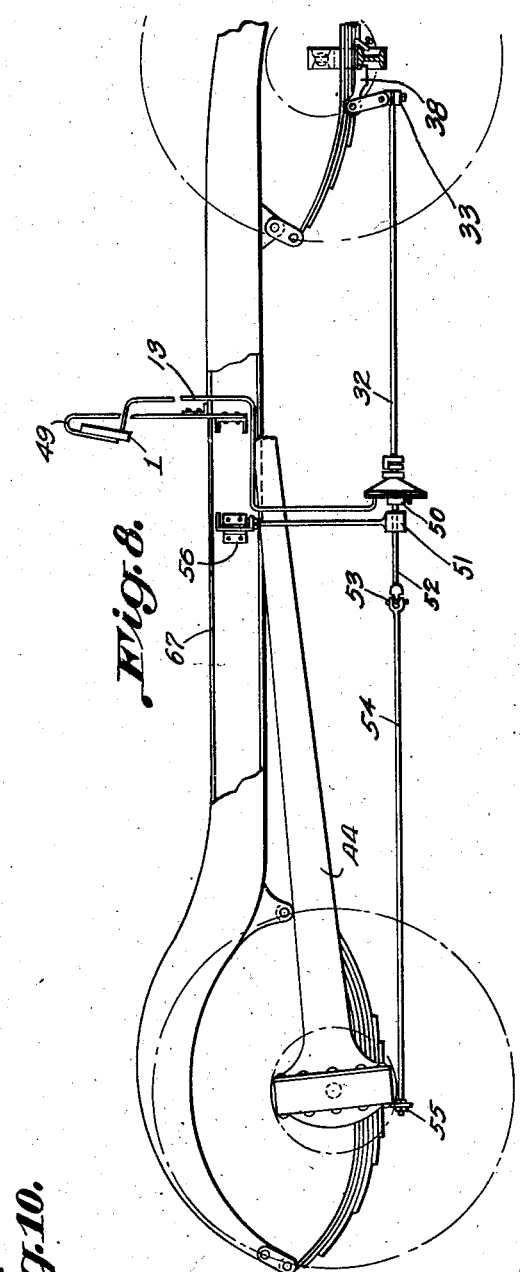
Inventor.
Oscar Theodore Nelson.
By His Attorney
Milburn & Milburn Patented Nov. 8, 1938

2,135,990

UNITED STATES PATENT OFFICE 2,135,990

DASHBOARD TIRE PRESSURE GAUGE

Oscar Theodore Nelson, Cleveland, Ohio

Application August 29, 1933, Serial No. 687,302

20 Claims. (Cl. 116—34)

This invention relates to improvements in dashboard gauges for automobiles.

One object is to provide a gauge that is operated by means of a positive connection of the same to the front and rear axles of an automobile or to members that are firmly connected to the axles.

Another object is to provide such a device that will indicate any change in the air pressure of any of the four tires.

Another object is to provide such a device which is actuated by the deviation of an axle from level as would be caused by deflated condition of one of the tires.

Another object is to provide such a device which is actuated by a rotary movement into which the tilting movement of the shaft, due to deflation of one of the tires, is converted.

Another object is to provide such a device in which a flexible diaphragm will be actuated by the deflated condition of one of the tires and thereby a column of liquid will be actuated so as to produce an indication upon the dash board of the automobile.

Another object is to provide such a device embodying means for absorbing longitudinal shock so as to prevent the same from being transmitted to the operating mechanism of the device.

Another object is to provide such a device in which a column of liquid is actuated to indicate the deflated condition of a tire and in which there is embodied means for amplifying the flow of liquid caused by movement of the diaphragm.

Another object is to provide such a device in which there is embodied an improved form of vented sight tube for the liquid-indicating means.

Another object is to provide such a device in which the flow of the liquid in the sight tube may be conveniently adjusted.

Another object is to provide such a device which has operative connection with the front and rear axles of the automobile and in which there is a universal joint in the longitudinal shaft forming part of the mechanism extending between the two axles.

With these and other objects in view, the invention consists in certain novel features of construction and combinations and arrangements of parts as will more fully appear from the following description and claims when considered in connection with the accompanying drawings.

Fig. 1 is a vertical section of my device as applied in Fig. 7;

Fig. 2 is a front elevation of the indicator on the dash board;

Fig. 3 is an end elevation of the diaphragm casing;

Fig. 4 is a top plan view of the take-up connection between the shaft 32 and screw 31;

Fig. 5 is a top plan view of the container above the sight tube;

Fig. 6 is an elevation of the hinge connection between the operating shaft 32 of my device and the axle 57;

Fig. 7 is a top plan view of an assembly of one of my devices, as illustrated partly in larger detail in Fig. 1;

Fig. 8 is an elevation of another form of assembly;

Fig. 9 illustrates another manner of relieving drive shaft 32 of my device from shock; and Fig. 10 is a front elevation of the same.

It is to be understood that the present disclosure is merely for purposes of illustration and that other modifications may be made without departing from the spirit of the present invention as herein set forth and claimed.

The body 1 of my gauge is adapted to be attached to the dash board 49 of an automobile and has the sight tube 6 the upper end of which has the communicating enlarged chamber 5 attached to the body 1 by the screws 63. The chamber 5 will receive any liquid which might be forced thereinto from the sight tube 6. The inverted rubber nipple 3 closes the top of chamber 5 and is secured thereto by the press fit ring 2. This nipple, being of flexible rubber, acts as a movable seal and prevents evaporation of the liquid. This nipple serves also in lieu of a vent although there may be employed a vent, here shown as closed by screw 4, when extreme accuracy is required.

That part of the gauge which is on the dash board is held in place by the rim 48.

Sight tube 6 has its middle part covered by the narrow blind 47 attached to the graduated scale 46 which is manually adjustable up or down. This scale 46 is held in set position by frictional engagement in groove 45 in which it is slidably adjustable.

The lower end of sight tube 6 is connected to an intermediate passage 8 which in turn communicates with the tube 13. This intermediate passage 8 may be restricted more or less by the adjustable screw 7. This intermediate passage is enclosed partly by the diaphragm 10 which may be adjusted by the screw 11 bearing against the central part thereof. The adjustable screw 11 is mounted in the arm 9 which is mounted upon the body 1 by means of screws 64. By adjusting screw 11, the level of the liquid in the sight tube 6 can be raised or lowered.

In order to ensure an even pressure entirely about the outer surface of diaphragm 10, I have secured ring 70 thereabout by means of screws 12. If desired, white lead may be used to seal the outer edge of diaphragm 10. The cavity in body 1 just below passage 8, is such as to enable a column of liquid to pass regardless of the extent to which the diaphragm might be adjusted. That is to say, passage through this cavity will at no time be closed off by the diaphragm.

The lower end of the cavity that is closed by diaphragm 10, communicates with tube 13, the other end of which connects with a cavity 15 provided between plate 18 and casting 19 which are secured together by screws 20. One side of cavity 15 is closed by flexible diaphragm 17 which has soldered to the central part of the opposite side thereof the plate 21 which is intended to amplify the amount of flow of the liquid in the tube 13 for any given movement of the diaphragm 17.

Spring 16 is arranged between the central part of the diaphragm 17 and the plate 18 and tends to ensure positive return movement of the diaphragm 17 when its actuation towards the left (as viewed in Fig. 1) has been discontinued.

The triple threaded left-hand screw 31 extends co-axially through the casting 19 and has operative engagement at its one end with the disk 21 and has screw thread engagement at its other end with the casting 19. A collar 22 is pinned to the shank of the screw 31 and affords an abutment for one end of coil spring 23 which abuts at its other end against the casting 19. The purpose of spring 23 is to maintain constant tension between screw 31 and the interengaging threads on casting 19.

The one end of screw 31, which extends beyond casting 19, is hollowed out so as to receive the end portion of drive shaft 32. Upon this end portion of screw 31 there is fixedly mounted the collar 25 by means of the set screw 24, this collar having operative engagement with the collar 27 which is fixedly mounted upon shaft 32 by means of set screw 26. A screw 28 is anchored in collar 25 and extends freely through an opening 69 in collar 27, the coil spring 29 surrounding screw 28 and abutting the collar 27 and the head of screw 28. Opening 69 is sufficiently large to permit the operation herein described.

Rotation of shaft 32 in one direction will cause collar 27 to engage spring 29 which in turn is engaged against head of screw 28 so as to cause turning of collar 25 and the screw 31, which is thereby given an axial movement for actuation of the diaphragm 17. In other words, collar 25 and screw 31 virtually turn with shaft 32. Such movement of screw 31 continues until the collar 25 abuts the shoulder of casting 19, whereupon further movement of screw 31 and diaphragm 17 is prevented. Any excess movement of shaft 32 beyond this point will be absorbed by compression of spring 29, and in this way, there is prevented any undue movement of the diaphragm 17. Thus, this constitutes a safety provision. When the shaft returns to normal condition, the parts constituting this safety device will also return to normal position.

The other end of shaft 32 is fastened between clamps 33 and 68 which are held together by screws 34. Hinge member 36 has pivotal connection with clamp member by means of pin 35 and with the main support 38 therefor by means of pin 37. The support 38 is clamped to the axle 57 by means of set screws 39. The purpose of this hinge connection together with stiff spring 14 is to take up the forward and backward motion caused by shock and thus protect the gauge actuating mechanism from such shock.

The liquid can be drained from the system by removing screw 41 which closes an opening in plate 18. When filling the gauge with liquid, air is permitted to escape from the diaphragm chamber by removal of screw 40 which seals a vent opening in the upper part of plate 18.

The upper part of casting 19 is provided with holes 66 adapted to receive the radius rods 42, these parts being secured together by nuts 65 which also serve to hold yoke 43 on casting 19. The torque tube 44 is adapted to extend through yoke 43 which is fitted thereto.

Referring to Fig. 7, there is illustrated the complete assembly of the gauge with torque tube and radius rods (see Fig. 1). In Fig. 7, there are also indicated the front axle 57 and rear axle housing 58.

In Fig. 8 there is illustrated a complete assembly in which the gauge is connected in a manner somewhat different from that shown in Fig. 7, the manner of assembly in Fig. 8 being intended for automobiles that have no torque tubes or radius rods to which the diaphragm can be conveniently attached. In Fig. 8, there is provided a second drive shaft 52 which is connected by the universal coupling 53 to the shaft 54 which in turn is connected by bracket 55 to the rear axle housing 58. The bracket 51 has its upper end clamped onto cross member 56 on the chassis 67. The lower end of bracket 51 has a bearing to support drive shaft 52 which is fixedly connected to the diaphragm assembly by means of set screw 50.

Instead of the hinge means illustrated in other figures of the drawing for relieving the shaft 32 from longitudinal shock, there may be employed another form of device for this purpose, as illustrated in Figs. 9 and 10. In this modification, there is a U-shaped spring 59 which has its one end affixed to the front axle 57 by means of screw 61 while the other end of this spring is apertured so as to receive the one end of shaft 32 which is secured thereto by means of nuts 60 on the shaft 32, these nuts being threaded onto the shaft 32 and engaging opposite sides of spring 59.

In order to prepare the gauge for operation, nipple 3 is removed so as to permit filling the device with the liquid and the screw 40 is also removed so as to supply an air vent. As the liquid is supplied into container 5, it will fill the chamber of diaphragm 17, whereupon the screw 40 is replaced. The liquid will then fill tube 13, the chamber adjoining diaphragm 10, passage 8, and sight tube 6. Then the height of the liquid in the sight tube 6 may be regulated by adjustment of screw 11 so as to bring the liquid level to the middle of the sight tube. Nipple 3 is then replaced and is hermetically sealed by the ring 2.

Thus, it will be seen that my gauge is operatively connected to the front and rear axles of the automobile so as to be responsive to the tilting movement of an axle caused by the deflation of a tire and the consequent prolonged lowering of that end of the axle. This tilting movement of an axle is rendered effective in actuating the gauge by virtue of the particular location and manner of connection of the gauge mechanism. By locating the gauge mechanism in the vertical, middle longitudinal plane of the automobile, the tilting movement of the axle is converted into a rotary movement of the operating shaft of the gauge mechanism. This rotary movement in turn is converted into a longitudinal movement by means of the screw means and the resulting longitudinal movement is utilized to actuate a flexible diaphragm which determines the level of a column of liquid in a sight tube on the dash board of the automobile.

When all four tires are equally inflated, the diaphragm will not be actuated as the axles will be level except for uneven portions in the road. Any unevenness in the road, however, will not affect the liquid in the sight tube as the needle valve 11 is adjusted so as to slow up the movement of the liquid column and thereby keep the level of liquid in the sight tube practically stationary under such condition. The flexibility of diaphragm 17 will take up any such disturbance that might be caused by unevenness in the road surface.

If the front right tire should become deflated, the shaft 32 will rotate to the right, as viewed by the driver, the screw 31 being a left-hand thread, and the diaphragm 17 is thereby actuated rearwardly so as to raise the level of the liquid in the sight tube accordingly.

If the front left tire should become deflated, the level of the liquid in the sight tube will be lowered, since the diaphragm 17 will be moved in the opposite or forward direction.

In the cases of the rear tires, the diaphragm 17 will be actuated in the same manner so as to vary the liquid level in the sight tube. When one of the rear tires becomes deflated, the diaphragm 17 and the plate 18 and casting 19 will be rotated about the axis of shaft 32 which remains stationary with the screw 31.

For instance, if the right rear tire should become deflated, the level of the column of liquid will be lowered as in the case of the left front tire becoming deflated. And the deflation of the left rear tire will affect the column of liquid in the same manner as the deflation of the right front tire.

Any excess inflation of the tires will also be indicated by this device, the effect produced upon the column of liquid by the excess inflation of a tire being the same as that produced by the deflation of the opposite tire, as will be understood.

In the above statement, it is of course understood that the degree of inflation or excess inflation of any tire at any time will determine the extent to which the level of the liquid is varied.

In my device, the diaphragm and triple thread screw are so sensitive that a variation of only three or four pounds pressure in a tire will be indicated in the sight tube on the dashboard.

Although my device is responsive to very slight variations in pressure of air in the tires, it is at the same time accurate and dependable on all kinds of roads including dirt roads, cobble stone roads, and roads with high crowns.

Depressions and bumps in the road will not affect the accuracy and dependability of this device when the automobile is travelling at a rate of speed of ten miles per hour or faster, as the two wheels on the same side of the automobile follow the same track, and the tendency of the tilting of the one axle to produce an indication in one direction in the sight tube will be off-set by the like tendency of the tilting of the other axle to produce an indication in the other direction.

The advantages resulting from this device will be readily understood from the above and it is to be understood that this device may be applied to any vehicle which might be adapted for the same.

What I claim is:

1. A device for indicating the condition of an automobile tire with respect to deflation, comprising an indicator means, shaft means so mounted in relation to an axle of the automobile as to be responsive to the tilting of an axle caused by the unbalanced condition of opposite tires with respect to deflation, and operative means of connection between said second-named means and said indicator means for transmitting an impulse to said indicator means only in response to prolonged unbalanced condition of opposite tires.

2. A device for indicating the condition of an automobile tire with respect to deflation, comprising an indicator means, rotatable means so mounted in relation to an axle of the automobile as to be responsive to the tilting of the axle caused by the unbalanced condition of opposite tires with respect to deflation, and operative means of connection for transmitting an impulse to said indicator means only in response to prolonged unbalanced condition of opposite tires.

3. A device for indicating the condition of an automobile tire with respect to deflation, comprising an indicator means, shaft means so mounted in relation to the front and rear axles of an automobile as to be responsive to the tilting of an axle caused by the unbalanced condition of opposite tires with respect to deflation, and operative means of connection between said second-named means and said indicator means for transmitting an impulse to said indicator means only in response to prolonged unbalanced condition of opposite tires.

4. A device for indicating the condition of an automobile tire with respect to deflation, comprising an indicator means, means so mounted in relation to the front and rear axles of an automobile as to be responsive to the tilting of an axle caused by the unbalanced condition of opposite tires with respect to deflation, and operative means of connection between said second-named means and said indicator means for transmitting an impulse to said indicator means only in response to prolonged unbalanced condition of opposite tires, and universal connecting means in said second-named means.

5. A device for indicating the condition of an automobile tire with respect to deflation, comprising means for indicating degrees of deflation, means so mounted in relation to an axle of the automobile as to be responsive to the tilting of the axle caused by the unbalanced condition of opposite tires with respect to deflation, and means for transmitting an impulse to said indicating means only in response to prolonged unbalanced condition of opposite tires.

6. A device for indicating the condition of an automobile tire with respect to deflation, comprising an indicator means, means so mounted in relation to an axle of the automobile as to be responsive to the tilting of the axle caused by the unbalanced condition of opposite tires with respect to deflation, means for transmitting an impulse to said indicator means only in response to a prolonged unbalanced condition of opposite tires, and a flexible connection between the axle and the said means affixed thereto and at the end thereof opposite to said indicator means.

7. A device for indicating the condition of an automobile tire with respect to deflation, comprising an indicator means, and shaft means, so mounted in relation to an axle of the automobile as to be responsive to the tilting of the axle caused by the unbalanced condition of opposite tires with respect to deflation, for actuating said indicator means, said actuating means including means for delaying the transmission of actuating impulses whereby said actuating means is responsive only to the prolonged tilting of the axle.

8. A device for indicating the condition of an automobile tire with respect to deflation, comprising an indicator means, and means, so mounted in relation to an axle of the automobile as to be responsive to the tilting of the axle caused by the unbalanced condition of opposite tires with respect to deflation, for actuating said indicator means, said actuating means including means for delaying the transmission of actuating impulses whereby said actuating means is responsive only to the prolonged tilting of the axle, and means for adjusting said delaying means so as to regulate the responsiveness of the actuating means to the tilting of the axle.

9. A device for indicating the condition of an automobile tire with respect to deflation, comprising an indicator means, shaft means responsive to the tilting of an axle of the automobile, operative means of connection between said shaft means and said indicator means, and means for restricting operation of said indicator means to only prolonged actuation of said shaft means.

10. A device for indicating the condition of an automobile tire with respect to deflation, comprising an indicator means, means responsive to the tilting of an axle of the automobile, operative means of connection between said responsive means and said indicator means, the parts of said operative means of connection being in constant engagement with each other, and means for restricting operation of said indicator means to only prolonged actuation of said responsive means.

11. A device for indicating the condition of an automobile tire with respect to deflation, comprising an indicator means, means responsive to the tilting of an axle of the automobile, operative means of connection between said responsive means and said indicator means, means for restricting operation of said indicator means to only prolonged actuation of said responsive means, and means for preventing transmission of longitudinal shock to said responsive means.

12. A device for indicating the condition of an automobile tire with respect to deflation, comprising an indicator means, diaphragm and screw means responsive to the tilting of an axle of the automobile, operative means of connection between said responsive means and said indicator means, and means for restricting operation of said indicator means to only prolonged actuation of said responsive means.

13. A device for indicating the condition of an automobile tire with respect to deflation, comprising a visible liquid type of indicator means, means responsive to the tilting of an axle of the automobile, operative means of connection between said responsive means and said indicator means, and means for restricting operation of said indicator means to only prolonged actuation of said responsive means.

14. A device for indicating the condition of an automobile tire with respect to deflation, comprising an indicator means, means responsive to the tilting of an axle of the automobile, operative means of connection between said responsive means and said indicator means, means for restricting operation of said indicator means to only prolonged actuation of said responsive means, and a flexible connection between said responsive means and its support for preventing transmission of longitudinal shock thereto.

15. A device for indicating the condition of an automobile tire with respect to deflation, comprising an indicator means, means responsive to the tilting of an axle of the automobile, operative means of connection between said responsive means and said indicator means, means for restricting operation of said indicator means to only prolonged actuation of said responsive means, and means for amplifying the effect of said responsive means upon said indicator means.

16. A device for indicating the condition of an automobile tire with respect to deflation, comprising an indicator means, means responsive to the tilting of an axle of the automobile, operative means of connection between said responsive means and said indicator means, and adjustable means for restricting the operation of said indicator means to only prolonged actuation of said responsive means.

17. A device for indicating the condition of an automobile tire with respect to deflation, comprising an indicator means of the visible liquid type including a container for the liquid thereof and a flexible nipple serving as a closure for said container, means responsive to the tilting of an axle of the automobile, and operative means of connection between said responsive means and said indicator means.

18. A device for indicating the condition of an automobile tire with respect to deflation, comprising an indicator means, means responsive to the tilting of an axle of the automobile, operative means of connection between said responsive means and said indicator means, means for restricting operation of said indicator means to only prolonged actuation of said responsive means, and yieldable means included in said responsive means for absorbing excess movement thereof.

19. A device for indicating the condition of an automobile tire with respect to deflation, comprising an indicator means of the visible liquid type, a sight means for the liquid, means responsive to the tilting of an axle of the automobile, operative means of connection between said responsive means and said indicator means, and an adjustable valve for regulating the amount of flow of the liquid in the sight means.

20. A device for indicating the condition of an automobile tire with respect to deflation, comprising means for indicating degrees of deflation, means responsive to the tilting of an axle of the automobile, operative means of connection between said responsive means and said indicating means, the parts of said operative means of connection being in constant engagement with each other, and means for restricting operation of said indicating means to only prolonged actuation of said responsive means.

OSCAR THEODORE NELSON.